United States Patent
Davis et al.

(10) Patent No.: US 9,983,355 B1
(45) Date of Patent: May 29, 2018

(54) STEP COUPLERS FOR PLANAR WAVEGUIDES

(71) Applicant: Analog Devices, Inc., Norwood, MA (US)

(72) Inventors: Scott Robert Davis, Denver, CO (US); Shrenik Deliwala, Andover, MA (US); Michael Ziemkiewicz, Norwood, MA (US); Derek Gann, Denver, CO (US); Andrew William Sparks, Arlington, MA (US); Michael Howard Anderson, Lyons, CO (US)

(73) Assignee: Analog Devices, Inc., Norwood, MA (US)

( * ) Notice: Subject to any disclaimer, the term of this patent is extended or adjusted under 35 U.S.C. 154(b) by 0 days. days.

(21) Appl. No.: 15/685,605

(22) Filed: Aug. 24, 2017

(51) Int. Cl.
*G02B 6/26* (2006.01)
*G02B 6/27* (2006.01)
*G02B 6/35* (2006.01)
*G02F 1/365* (2006.01)

(52) U.S. Cl.
CPC .............. *G02B 6/262* (2013.01); *G02B 6/26* (2013.01); *G02B 6/27* (2013.01); *G02B 6/2713* (2013.01); *G02B 6/35* (2013.01); *G02B 6/3536* (2013.01); *G02F 1/365* (2013.01)

(58) Field of Classification Search
CPC . G02B 6/262; G02B 6/26; G02B 6/35; G02B 6/27; G02B 6/2713; G02B 6/3536; G02B 5/18; G02B 5/1876; G02F 1/365
See application file for complete search history.

(56) References Cited

U.S. PATENT DOCUMENTS

| | | | |
|---|---|---|---|
| 4,545,642 A | 10/1985 | Auracher et al. | |
| 4,653,844 A | 5/1987 | Ward | |
| 5,208,882 A * | 5/1993 | Strasser | G02B 6/124 385/130 |
| 5,887,103 A * | 3/1999 | Jeong | G02B 6/124 385/122 |
| 7,720,116 B2 | 5/2010 | Anderson et al. | |
| 8,311,372 B2 | 11/2012 | Anderson et al. | |
| 8,380,025 B2 | 2/2013 | Anderson et al. | |
| 8,463,080 B1 | 6/2013 | Anderson et al. | |
| 8,860,897 B1 | 10/2014 | Anderson et al. | |
| 8,989,523 B2 | 3/2015 | Anderson et al. | |
| 9,366,938 B1 | 6/2016 | Anderson et al. | |
| 9,753,226 B2 * | 9/2017 | Frish | G02B 6/30 |
| 2005/0271325 A1 | 12/2005 | Anderson et al. | |
| 2017/0153530 A1 | 6/2017 | Anderson et al. | |
| 2017/0192264 A1 | 7/2017 | Anderson et al. | |

* cited by examiner

*Primary Examiner* — Ryan Lepisto
*Assistant Examiner* — Erin Chiem
(74) *Attorney, Agent, or Firm* — Schwegman Lundberg & Woessner, P.A.

(57) ABSTRACT

An optical coupler can be provided for coupling a light beam into a waveguide. The optical coupler can include a stepped structure, such as to reduce difficulties during manufacture, reduce expenses associated with manufacture, and additionally, to provide an increased acceptance angle of the optical coupler. The waveguide can include a guiding region where a cladding thickness can be increased relative to a coupling region, such as to reduce losses due to evanescent outcoupling in the guiding region.

20 Claims, 10 Drawing Sheets

STEP COUPLERS FOR PLANAR WAVEGUIDES

FIELD OF THE DISCLOSURE

The present disclosure relates to systems and methods for coupling a light beam into a planar waveguide.

BACKGROUND

Certain optical couplers can couple a free space optical beam into a waveguide.

SUMMARY OF THE DISCLOSURE

In certain systems, a smoothly tapered optical coupler can be used to couple a free space light beam into a waveguide. The smoothly tapered optical coupler can be difficult and/or expensive to manufacture. Additionally, smoothly tapered optical couplers may limit an acceptance angle of the optical coupler. The inventors have recognized, among other things, the need for an optical coupler having a stepped structure, such as to reduce difficulties during manufacture, reduce expenses associated with manufacture, and additionally, to provide an increased acceptance angle of the optical coupler. Further features of the disclosure are provided in the appended claims, which features may optionally be combined with each other in any permutation or combination, unless expressly indicated otherwise elsewhere in this document.

In an aspect, the disclosure can feature a planar waveguide for receiving and guiding a light beam with reduced evanescent coupling of the light beam during the guiding. The planar waveguide can include a waveguide core and a first and second optical cladding, such as to guide the light beam along a length of the waveguide. The planar waveguide can also include an optical coupler having a first coupling region separate from a guiding region, the optical coupler including at least one stepwise decrease in thickness between the first coupling region and the guiding region and the first optical cladding including at least one corresponding stepwise increase in thickness between the first coupling region and the guiding region, such as to reduce evanescent coupling in the guiding region, and wherein the first coupling region of the optical coupler can be capable of in-coupling light into the waveguide core. The first coupling region of the optical coupler can be capable of in-coupling a portion of the light beam having a near-field profile that overlaps with a near-field exponential profile. The optical coupler can include a series of stepwise decreases in thickness between the first coupling region and the guiding region and the first optical cladding can include corresponding stepwise increases in thickness between the first coupling region and the guiding region, and wherein the optical coupler can be configured to couple a portion of the light beam having a near-field profile that overlaps with a near-field exponential profile. The optical coupler can include a series of varying stepwise decreases in thickness between the first coupling region and the guiding region and the first optical cladding can include corresponding varying stepwise increases in thickness between the first coupling region and the guiding region. The varying stepwise decreases in thickness can include a varying height and width of an individual one of the stepwise decreases in thickness, and the optical coupler can be configured to couple a portion of the light beam having a near-field profile where a majority of the near-field profile overlaps with a near-field exponential profile. The planar waveguide can also include at least one spacer, such as to define a distance between the waveguide core and the optical coupler that can provide for in-coupling a portion of a light beam having a near-field profile that overlaps with a near-field exponential profile into the waveguide core and the first optical cladding can include a liquid crystal material. The planar waveguide can also include a solid fill material that can be located between the liquid crystal material and the optical coupler. The optical coupler can be configured to couple a free space light beam having a Gaussian profile with an efficiency of at least 80%. The optical coupler can include a second coupling region separate from the guiding region and a stepwise increase in thickness between the second coupling region and the guiding region and the first optical cladding can include a stepwise decrease in thickness between the second coupling region and the guiding region, such as to increase coupling in the second coupling region, and the second coupling region of the optical coupler can be capable of transversely out-coupling a portion of the light beam guided by the waveguide core. The optical coupler can include a series of varying stepwise increases in thickness between the second coupling region and the guiding region and the first optical cladding can include corresponding varying stepwise decreases in thickness between the second coupling region and the guiding region. The varying stepwise increases in thickness can include a varying height and width of individual ones of the stepwise increases in thickness, and the varying stepwise increases in thickness can be adjusted, such as to modify a profile of an out-coupled portion of the light beam guided by the waveguide core.

In an aspect, the disclosure can feature a method of coupling a free space light beam to a planar waveguide. The method can include in-coupling light into a core in a first region of the planar waveguide via an optical coupler and a first cladding having a first thickness. The method can also include guiding the in-coupled light through a second region of the planar waveguide in which the first cladding has a second thickness greater than the first thickness, where at least one step between the first thickness and the second thickness can be located in the first cladding between the first and second regions of the waveguide. The method can also include out-coupling light from the core in a third region of the waveguide, which can be separated from the first region of the waveguide by the second region of the waveguide, via an optical coupler and the first cladding can have a third thickness that is less than the second thickness, where a step between the second thickness and the third thickness can be located in the first cladding between the second and third regions of the waveguide. The method can also include providing a spacer, such as to mechanically define a distance between a core of the planar waveguide and an optical coupler in the first region of the waveguide, such as to provide for evanescent coupling in the first region of the waveguide, and where the first cladding can include a liquid crystal material. The method can also include providing a solid fill material located between the liquid crystal material and the optical coupler. The method can also include providing an optical coupler having a stepped structure that can include a series of stepwise decreases in thickness between the first region of the waveguide and the second region of the waveguide and providing a first optical cladding having a corresponding stepped structure including a series of stepwise increases in thickness between the first region of the waveguide and the second region of the waveguide. A distance between the core of planar waveguide and the length of the third region of the waveguide can determine a size and profile of the outcoupled portion of the guided light beam.

In an aspect, the disclosure can feature a method of manufacturing a planar waveguide. The method can include providing an optically transparent substrate. The method can also include etching a portion of the optically transparent substrate, such as to form at least one stepwise decrease in thickness between a first coupling region and a guiding region. The method can also include depositing a first optical cladding that can have at least one corresponding stepwise increase in thickness between the first coupling region and the guiding region on the surface of the optically transparent substrate. The method can also include depositing a core material stacked on the surface of the first optical cladding. The method can also include depositing a second optical cladding stacked on the surface of the core material. The method can also include providing at least one spacer, such as to determine a distance between a core of the planar waveguide and the optical coupler in the first coupling region, and providing a liquid crystal material that can be adjacent to the at least one spacer. The method can also include etching a portion of the optically transparent substrate, such as to form a series of varying stepwise decreases in thickness between a first coupling region and the guiding region and depositing a first optical cladding having a series of stepwise increases in thickness between the first coupling region and the guiding region.

BRIEF DESCRIPTION OF THE DRAWINGS

The present disclosure will now be described, by way of example, with reference to the accompanying drawings, in which.

DETAILED DESCRIPTION

Optical couplers can couple a light beam into a waveguide. Certain optical couplers can include a smoothly tapered region that can couple a light beam into a waveguide.

However, the smoothly tapered region can be difficult and/or expensive to manufacture. Described below is an optical coupler having a stepped structure, such as to reduce difficulties during manufacture, reduce expenses associated with manufacture, and additionally, to provide an increased acceptance angle of the optical coupler.

Figure 1:
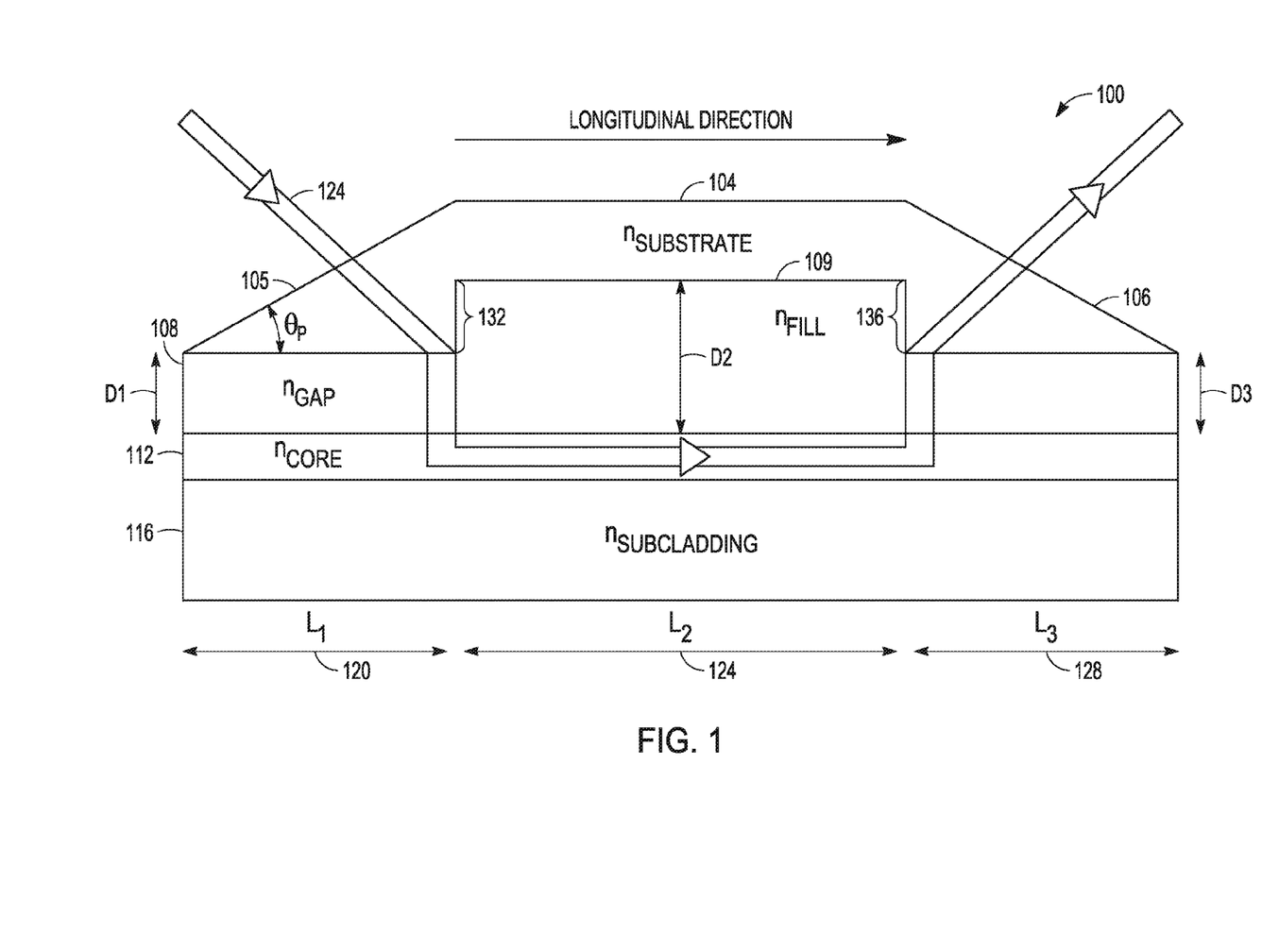
FIG. 1 illustrates an example of a planar optical waveguide.

FIG. 1 illustrates an example of a planar optical waveguide 100. The optical waveguide 100 can include an optical coupler 104, a first optical cladding 108, a waveguide core 112, and a second optical cladding 116. The optical coupler 104, the first optical cladding 108, the waveguide core 112, and the second optical cladding 116 can form a stack as illustrated in FIG. 1. The planar optical waveguide 100 can include an incoupling region 120, a guiding region 124, and an outcoupling region 128. In the incoupling region 120, a thickness of the first optical cladding 108 (D1) can be selected, such as to facilitate evanescent coupling of a light beam from the optical coupler 104 to the waveguide core 112. An evanescent coupling strength can be represented by the expression $$h = e^{-ks\sqrt{\beta^2 - n_{gap}^2}},$$

where h can represent an evanescent coupling strength, k can represent a wavenumber, S can represent a width of a region that light is tunnelling through, $\beta$ can represent an effective index of a light beam, and $n_{gap}$ can represent an effective index in the region the light is tunnelling through. The light beam can include an evanescent tail that decays exponentially as a function of distance from the waveguide core 112. Evanescent coupling can occur when an evanescent tail of the light beam penetrates into the optical coupler 104. Evanescent coupling of the light beam from the waveguide core 112 to the optical coupler 104 can increase as the evanescent tail of the light beam penetrates further into the optical coupler 104. A thickness of the first optical cladding 108 can be used adjust an amount of evanescent coupling between the waveguide 112 and the optical coupler 104. For example, increasing a thickness of the first optical cladding 108 can reduce the evanescent coupling between the waveguide core 112 and the optical coupler 104, and decreasing a thickness of the first optical cladding 108 can increase the evanescent coupling between the waveguide core 112 and the optical coupler 104. The optical coupler can include a facet 105, such as to provide a light beam to the interface between the optical coupler 104 and the first optical cladding 108. An angle of the facet, $\theta_p$, can be selected such as to provide a light beam having an angle of incidence beyond the critical angle determined by the interface between the optical coupler 104 and the first optical cladding 108 (e.g., between 0.1 to 10 degrees beyond the critical angle). An angle of incidence of the light beam can determine a decay length of an evanescent tail of the light beam. In an example, the optical coupler 104 can include a diffraction grating instead of the facet 105, where the diffraction grating can provide a light beam to the interface between the optical coupler 104 and the first optical cladding 108 at an angle of incidence beyond the critical angle determined by the interface between the optical coupler 104 and the first optical cladding 108 (e.g., between 0.1 to 10 degrees beyond the critical angle). In the guiding region 124, a thickness of the first optical cladding 108 (D2) can be selected, such as to reduce or prevent evanescent coupling of the light beam from the waveguide core 112 to the optical coupler 104. The thickness of the first optical cladding 108 (D2) can be selected such as to limit losses in the guiding region 124 to be less than 1 dB/cm. In an example, the thickness of the first optical cladding 108 in the guiding region 124 can be in a range from 2 μm to 10 μm. The change in thickness in the first optical cladding 108 between the incoupling region 120 and the guiding region 124 can include a step-like structure 132. A slope of the step-like structure 132 can be at least 100 to 1. In the outcoupling region 128, a thickness of the first optical cladding 108 (D3) can be selected, such as to facilitate evanescent coupling of a light beam from the waveguide core 112 to the optical coupler 104. The change in thickness in the first optical cladding 108 between the outcoupling region 128 and the guiding region 124 can include a step like structure 136. A slope of the step-like structure 136 can be at least 100 to 1. The first optical cladding 108 can be adjacent to, and located above the waveguide core 112 as illustrated in FIG. 1. The second optical cladding can be adjacent to, and located below the waveguide core 112 as illustrated in FIG. 1. The optical coupler 104 can be adjacent to, and located above the first optical cladding 108. The optical coupler 104 can include a silicon material. The first optical cladding 108 can include a glass material, a crystalline material, or a plastic material. The second optical cladding 116 can include a glass material, a crystalline material, a plastic material, or a liquid crystal material. During operation, a free space light beam 124 can be incident upon the facet 105 of the optical coupler 104. The free space light beam 124 can be incident upon the facet 105 at an angle near Brewster's angle. The light beam can then travel through the optical coupler 104 to a portion of the optical coupler near the boundary between the coupling region 120 and the guiding region 124. A portion of the light beam having an overlap with a near-field exponential profile can then be coupled to the waveguide core 112. The term near-field can refer to a region within one Rayleigh length ($Z_R$) of an interface, where the Rayleigh length can be described by the expression $$z_R = \frac{n\pi w_o^2}{\lambda},$$

where n can represent an index of refraction, $w_o$ can represent a beam waist, and λ can represent a wavelength of light. The coupled portion of the light beam 124 can then be guided through the guiding region 124. Near a boundary between the guiding region 124 and the outcoupling region 128, a portion of the free space light beam can be outcoupled from the waveguide core to the optical coupler 104. After travelling through the optical coupler 104, the outcoupled portion of the light beam can exit the optical coupler 104 at a facet 106.

Figure 2A:
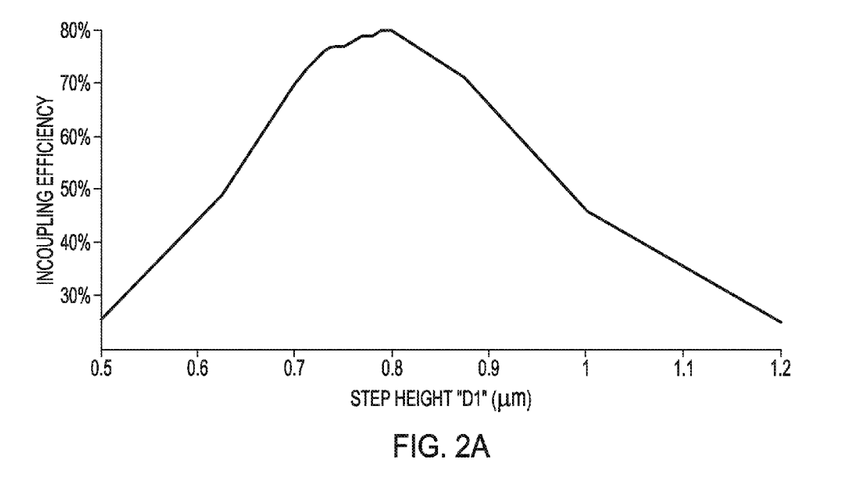
FIG. 2A illustrates an example of simulated results of coupling efficiency in a waveguide.

FIG. 2A illustrates an example of simulated results of coupling efficiency in a waveguide, such as the planar optical waveguide 100 shown in FIG. 1. The coupling efficiency can vary with a thickness of the first optical cladding 108. In the example, a thickness of the first optical cladding can be varied in a range from about 0.5 μm to about 1.2 μm. In the example illustrated in FIG. 2, the coupling efficiency can have a local maximum of approximately 80% where the thickness of the first optical cladding can be about 0.8 μm. In an example, an index of refraction of the optical coupler 104 can be greater than an index of refraction of the first optical cladding 108, and an index of refraction of the waveguide core 108 can be greater than an index of refraction of the first optical cladding 108.

Figure 2B:
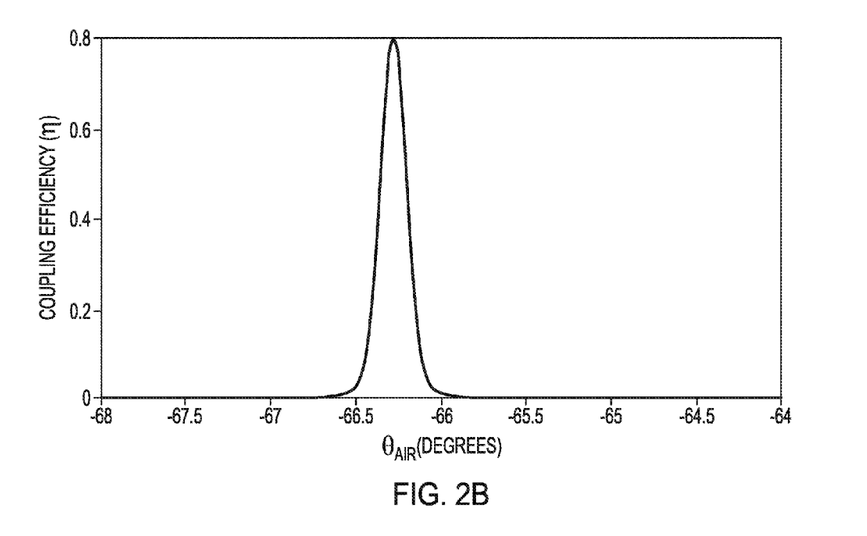
FIG. 2B illustrates an example of simulated results of coupling efficiency in a waveguide.

FIG. 2B illustrates an example of simulated results of coupling efficiency in a waveguide, such as the planar optical waveguide 100 shown in FIG. 1. The coupling efficiency can vary with an angle of incidence of the light beam 124. The coupling efficiency can be maximized when the angle of incidence of the light beam 124 is beyond the critical angle between the first optical cladding 108 and the waveguide core 112 (e.g., between 0.1 to 20 degrees beyond the critical angle). An acceptance angle of the waveguide can be approximately 0.2 degrees as illustrated in FIG. 2B.

Figure 3A:
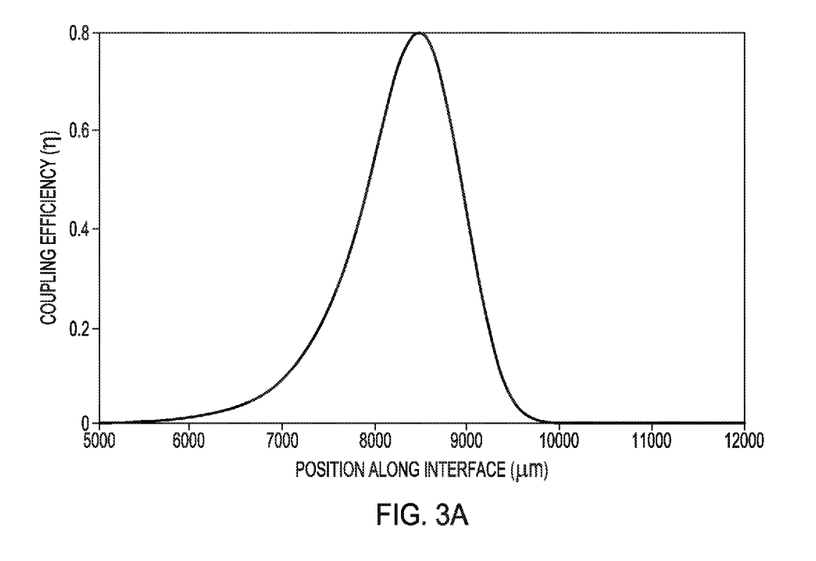
FIG. 3A illustrates an example of stimulated results of coupling efficiency in a waveguide.

FIG. 3A illustrates an example of stimulated results of coupling efficiency in a waveguide such as the planar optical waveguide 100 shown in FIG. 1. The coupling efficiency can vary with a position of the light beam 124 along a longitudinal direction of the waveguide. The coupling efficiency can be maximized when a position of the light beam is proximal to a boundary between the incoupling region 120 and the guiding region 124. The full width at half max of the coupling efficiency illustrated in FIG. 3A can correspond to approximately five beam waists.

Figure 3B:
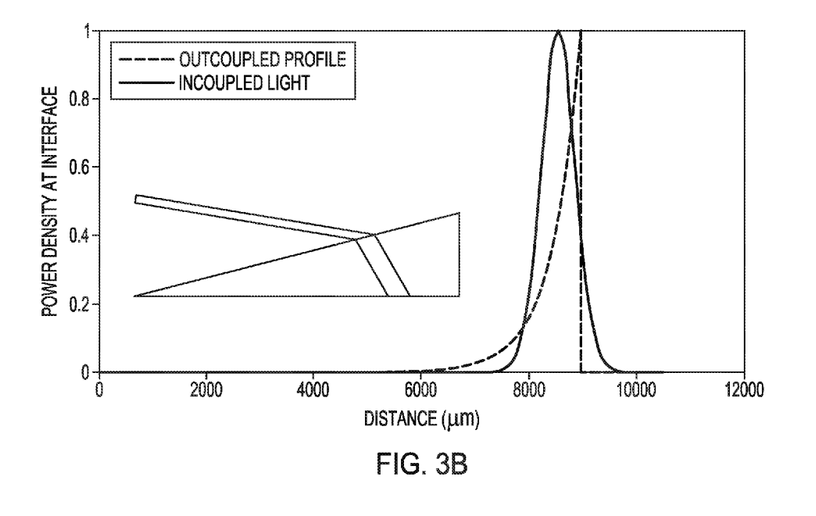
FIG. 3B illustrate examples of near-field power density profiles in a waveguide.

FIG. 3B illustrates an example of a near-field power density profile 308 of an outcoupled light beam and a near-field power density profile 304 of an incoupled light beam at the interface between the incoupling region 120 and the guiding region 124. The near-field power density profile 308 of the outcoupled light beam can include an exponential profile combined with a step profile as illustrated in FIG. 3B. The step in the near-field power density profile 308 can correspond to a boundary between the guiding region 124 and the incoupling region 120. After propagating to the far-field, the near-field power density profile 308 can transform into a Lorentzian profile. The near-field power density profile 304 of the incoupled light beam can include a Gaussian profile. An optimal coupling efficiency of a light beam having a Gaussian profile can occur when the Gaussian light beam is incident near a boundary of the incoupling region 120 and the waveguide core 124. For example, an optimal coupling efficiency can correspond to a situation where a center of the Gaussian light beam is approximately one beam waist away from a boundary of the incoupling region 120 and the waveguide core 124. In an example, an optimal coupling efficiency can occur when an overlap between the near-field power density profile 308 of the outcoupled light beam and the near-field power density profile 304 of the incoupled light beam at the interface between the incoupling region 120 and the guiding region 124 is maximized. An overlap between the near-field power density profiles can be expressed as follows:

$$\eta = \frac{|\langle \Omega | V_{in} \rangle|^2}{\langle V_{in} | V_{in} \rangle \langle \Omega | \Omega \rangle}$$

Where η can represent an incoupling efficiency, such as the incoupling efficiency shown in FIG. 2A, Ω can represent an electric field distribution in an outcoupled beam along the interface, with phase information preserved, and $V_{in}$ can represent the electric field distribution along the interface for the incoming light beam, again with phase information preserved. The brackets can (<|>) represent overlap integrals.

Figure 4:
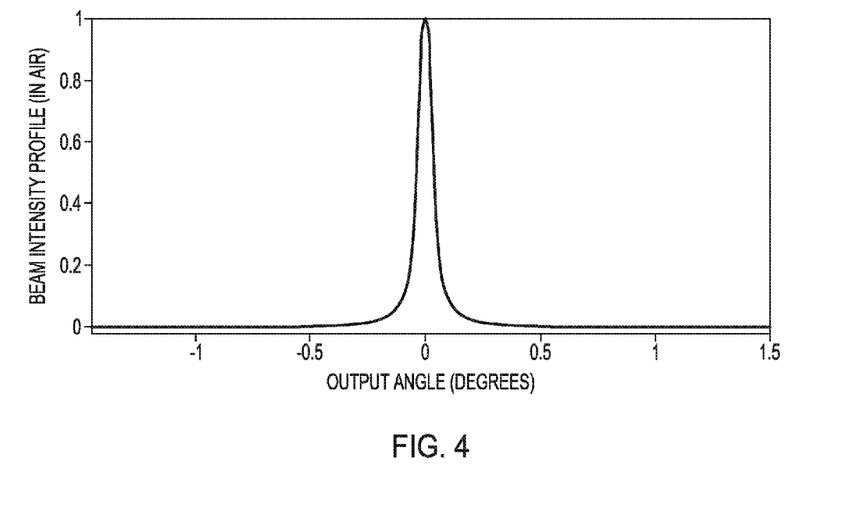
FIG. 4 illustrates an example of a far-field power density of an outcoupled light beam.

FIG. 4 illustrates an example of a far-field power density of an outcoupled light beam, such as that can be outcoupled from the outcoupling region 128 as illustrated in FIG. 1. The far-field power density can include a Lorentzian profile. In an example, the far-field Lorentzian profile can correspond to a near-field exponential profile.

Figure 5A:
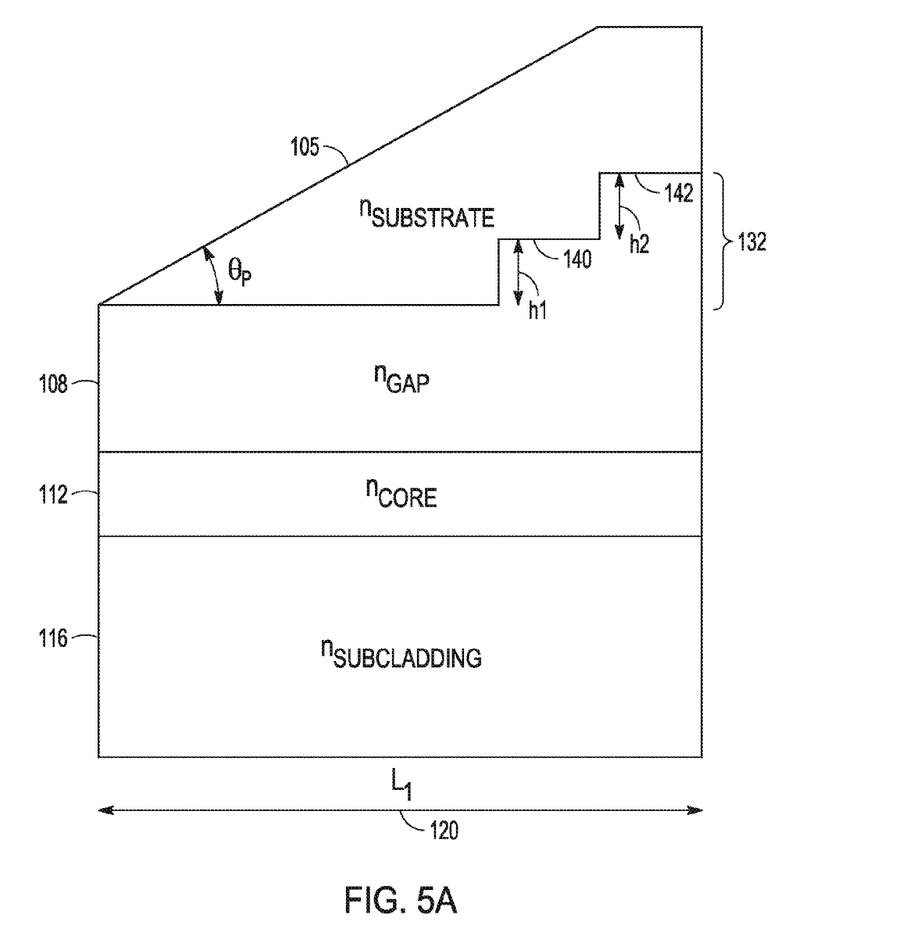
FIGS. 5A-5B illustrate examples of an incoupling region.

FIG. 5A illustrates an example of an incoupling region, such as the incoupling region 120 shown in FIG. 1. In FIG.

Figure 6:
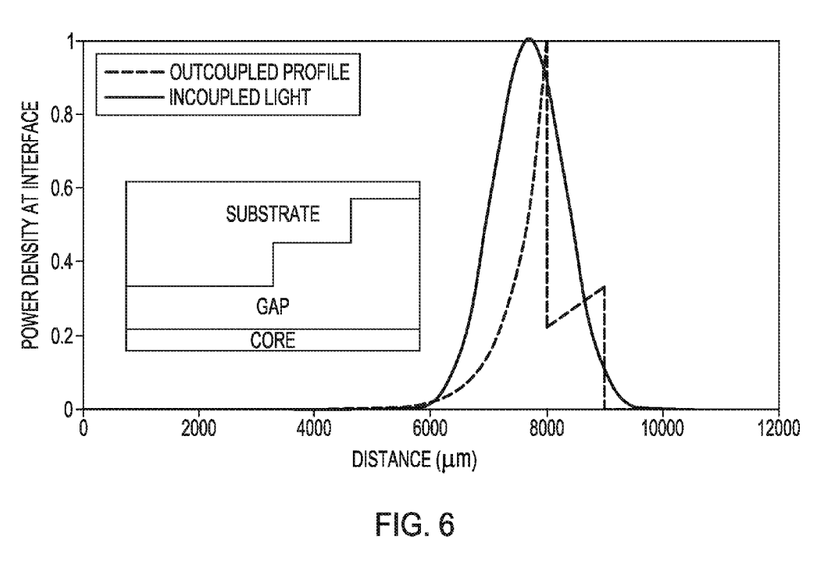
FIG. 6 illustrates an example of a near-field power density profile in a waveguide.

5A, the step-like structure 132 can include a first terrace 140 having a height h1, and a second terrace 142 having a height h2. The height of the terraces can be selected, such as to provide a near-field power density profile having a greater overlap with a Gaussian profile than a step-like structure having a single step, such as the single step shown in FIG. 1. In an example, the height of each terrace can be determined by the expression $$h_{terrace} = \frac{m\lambda}{\sqrt{n_{optical\ coupler}^2 - n_{effective}^2}},$$

where m can represent a diffractive order, λ can represent a wavelength of light of the light beam 124, $n_{optical\ coupler}$ can represent an index of refraction of the optical coupler 104, and $n_{eff}$ can represent an effective index of refraction of a light beam guided down the core of the planar optical waveguide 100. In an example, the height of each terrace can be selected to be smaller than a wavelength of light, such as to form a Fresnel type element. For example, to operate in a Fresnel regime, a height of each of the terraces can be in a range from 10 nm to 400 nm at an operation wavelength of 1.5 μm. In the Fresnel regime, each of the terraces can have a different height (e.g., the height of the terraces can vary by as much as 400 nm from terrace to terrace). In the example shown in FIG. 5A, a near-field power density profile of an outcoupled light beam can include a series of exponential regions, as illustrated in FIG. 6. In an example, the coupling efficiency of a single terrace can be approximately 80% and a coupling efficiency of two terraces can be approximately 90%. In an example, the height of each terrace can be determined by approximating a smooth, tapered profile with a series of terraces each having a height smaller than a wavelength of the light beam (e.g., terraces can have a height in a range from 20 nm to 500 nm).

Figure 5B:
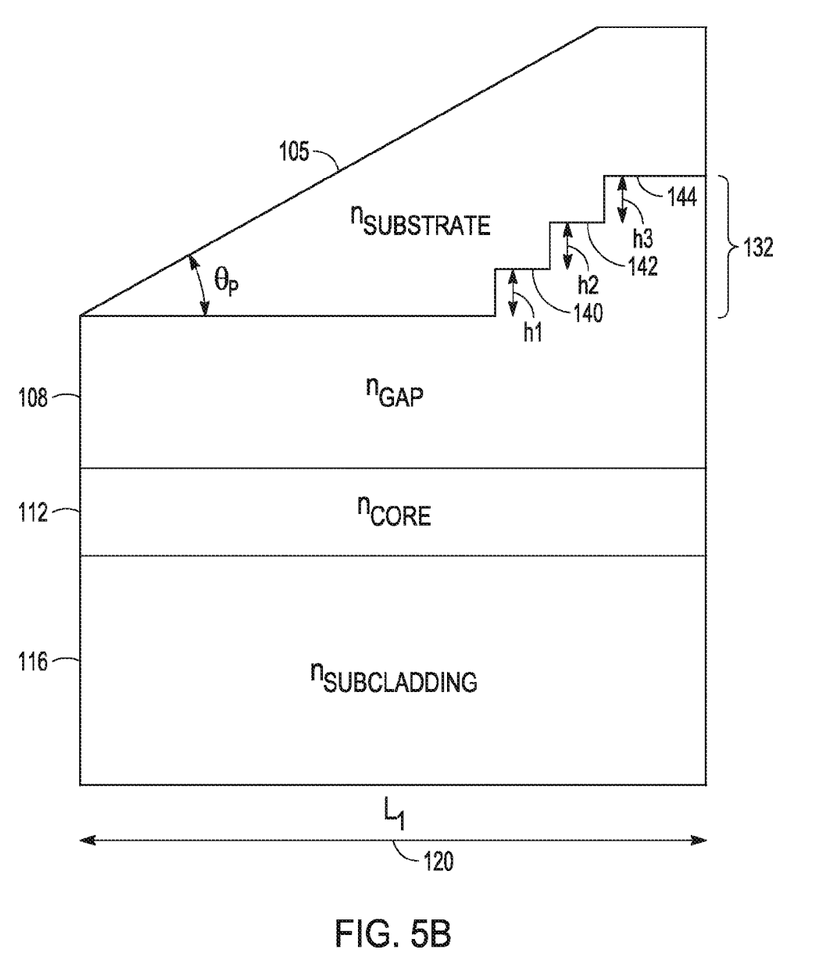

FIG. 5B illustrates an example of an incoupling region, such as the incoupling region 120 shown in FIG. 1. In FIG. 5B, the step-like structure 132 can include a first terrace 140 having a height h1, a second terrace 142 having a height h2, and a third terrace 144 having a height h3. The height of the terraces can be selected, such as to provide a near-field power density profile having a greater overlap with a Gaussian profile than a step-like structure having two terraces, such as the two terraces shown in FIG. 5A. The height of each terrace can be determined by the expression described above with respect to FIG. 5A. In the example shown in FIG. 5B, a near-field power density profile of an outcoupled light beam can include a series of exponential regions. In an example, the coupling efficiency of a single terrace can be approximately 80%, a coupling efficiency of two terraces can be approximately 90%, and a coupling efficiency of three terraces can be greater than 90%.

Figure 7:
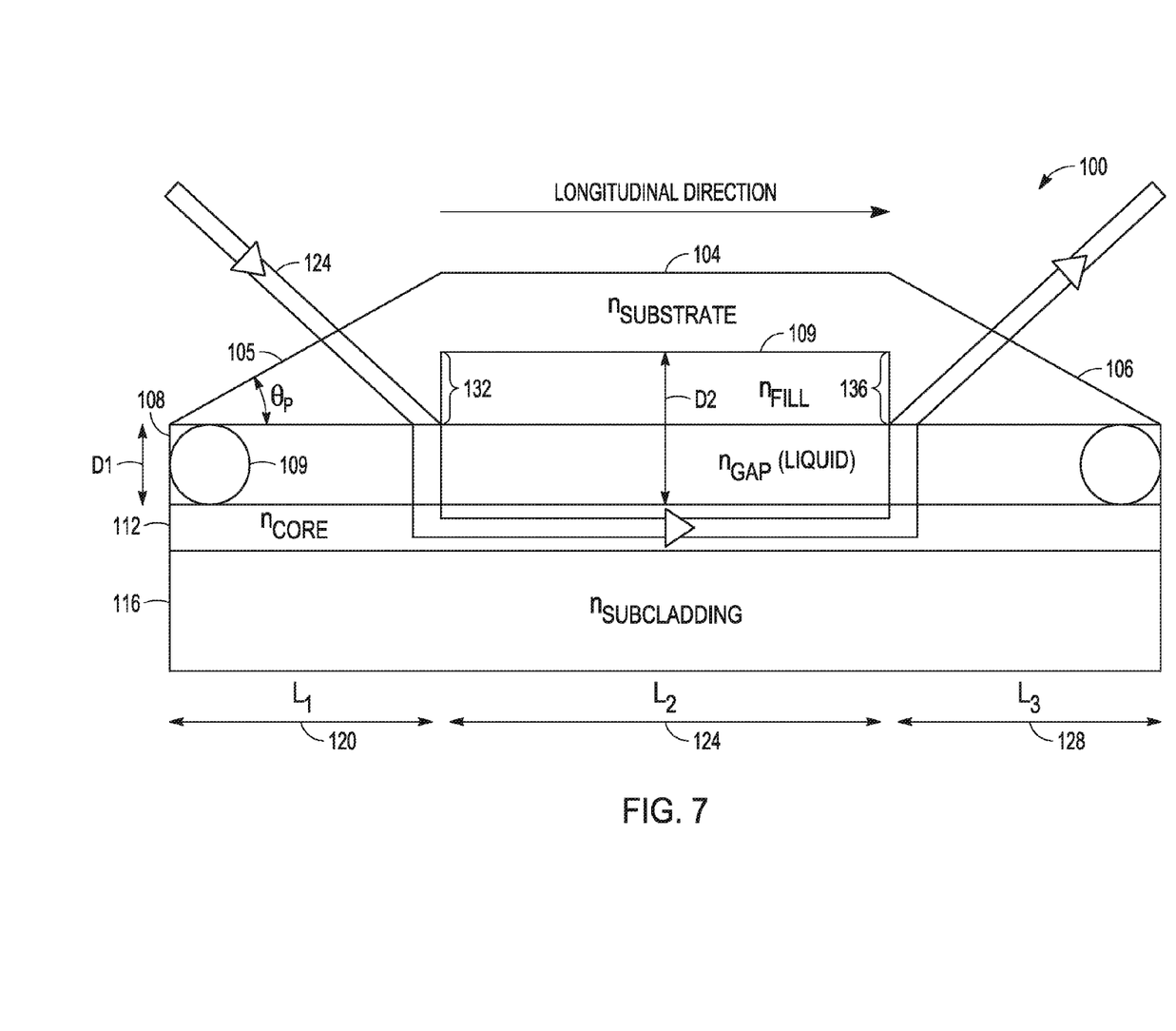
FIG. 7 illustrates an example of a planar optical waveguide.

FIG. 7 illustrates an example of a planar optical waveguide 700. The planar optical waveguide 700 can include an optical coupler 104, a first optical cladding 108, a waveguide core 112, and a second optical cladding 116. The optical coupler 104, the first optical cladding 108, the waveguide core 112, and the second optical cladding 116 can form a stack as illustrated in FIG. 7. The first optical cladding 108 can include a liquid material, such as a liquid crystal material. The optical waveguide 700 can include spacers 109 that can define a thickness of the liquid material in the planar optical waveguide 700. In an example, the spacers 109 can form an integral portion of the optical coupler 104. For example, pillars or stand-offs can extend from the optical coupler 104 to a surface of the waveguide core 112. The optical waveguide 700 can also include seals that can reduce leakage of the liquid material from the planar optical waveguide 700. In an example where the first optical cladding 108 can include a liquid, the first optical cladding 108 can include a solid fill material 109 located above the liquid material as illustrated in FIG. 7, such as to reduce undesired edge effects that may occur when the liquid material surrounds a corner or edge. Undesired edge effects can include misaligned liquid crystal molecules (e.g., liquid crystal molecules aligned in undesired directions). Such misaligned liquid crystal molecules can undesirably cause scattering of the light beam. The planar optical waveguide 700 can include an incoupling region 120, a guiding region 124, and an outcoupling region 128. In the incoupling region 120, a thickness of the first optical cladding 108 (D1) can be determined by a width of the spacers 109. In an example, the spacers 109 can include glass beads or glass spheres. The width of the spacers can be selected, such as to facilitate evanescent coupling of a light beam from the optical coupler 104 to the waveguide core 112. The optical coupler can include a facet 105, such as to provide a light beam to the interface between the optical coupler 104 and the first optical cladding 108. An angle of the facet, $\theta_p$, can be selected such as to provide a light beam having an angle of incidence beyond the critical angle determined by the interface between the optical coupler 104 and the first optical cladding 108 (e.g., between 0.1 to 10 degrees beyond the critical angle). In an example, the optical coupler 104 can include a diffraction grating instead of the facet 105, where the diffraction grating can provide a light beam to the interface between the optical coupler 104 and the first optical cladding 108 at an angle of incidence beyond the critical angle determined by the interface between the optical coupler 104 and the first optical cladding 108 (e.g., between 0.1 to 10 degrees beyond the critical angle). In the guiding region 124, a thickness of the first optical cladding 108 (D2) can be selected, such as to reduce or prevent evanescent coupling of the light beam from the waveguide core 112 to the optical coupler 104. The change in thickness in the first optical cladding 108 between the incoupling region 120 and the guiding region 124 can include a step-like structure 132. In the outcoupling region 128, a thickness of the first optical cladding 108 (D3) can be selected, such as to facilitate evanescent coupling of a light beam from the waveguide core 112 to the optical coupler 104. The change in thickness in the first optical cladding 108 between the outcoupling region 128 and the guiding region 124 can include a step like structure 136.

During operation, a free space light beam 124 can be incident upon the facet 105 of the optical coupler 104. The free space light beam 124 can be incident upon the facet 105 at an angle near Brewster's angle. The light beam can then travel through the optical coupler 104 to a portion of the optical coupler near the boundary between the coupling region 120 and the guiding region 124. A portion of the light beam having overlap with a near-field exponential profile can then be coupled to the waveguide core 112. The coupled portion of the light beam 124 can then be guided through the guiding region 124. Near a boundary between the guiding region 124 and the outcoupling region 128, a portion of the free space light beam can be outcoupled from the waveguide core to the optical coupler 104. After travelling through the optical coupler 104, the outcoupled portion of the light beam can exit the optical coupler 104 at a facet 106. At least one electrode can be included below the second optical cladding 116. A voltage can be applied to the at least one electrode, such as to modulate an index of refraction of the liquid crystal material in the first optical cladding 108.

Figure 8:
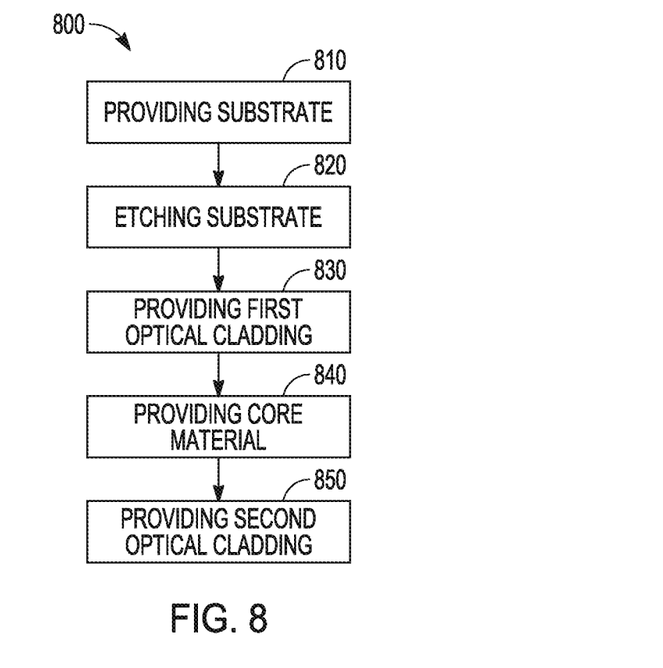
FIG. 8 illustrates a method of manufacturing a planar optical waveguide.

FIG. 8 illustrates a method of manufacturing a planar optical waveguide, such as planar optical waveguide 100 or 700. An optically transparent substrate can be provided (step 810). The substrate can then be etched, such as to provide an optical coupler, such as the optical coupler 104 (step 820). A first optical cladding, such as the first optical cladding 108 can then be provided (step 830). In an example the first optical cladding can be deposited onto the optical coupler. The first optical cladding can include an optically transparent material. The deposited optical cladding can then be etched to adjust a thickness of the first optical cladding. A core material, such as the waveguide core 112 can then be provided (step 840). In an example, the waveguide core can be deposited onto the first optical cladding. The waveguide core can include an optically transparent material. A second optical cladding, such as the second optical cladding 116 can then be provided (step 850). In an example the second optical cladding can be deposited onto the waveguide core. The second optical cladding can include an optically transparent material. In an example, the second optical cladding can be provided as a substrate, and a waveguide core can be deposited onto the second optical cladding. Spacers, such as the spacers 109 shown in FIG. 7 can then be attached to the waveguide core and a liquid material, such as a liquid crystal material can then be provided to a region between the spacers. The optical coupler can then be stacked on top of the spacers to form a waveguide, such as the waveguide 700 as shown in FIG. 7.

Figure 9:
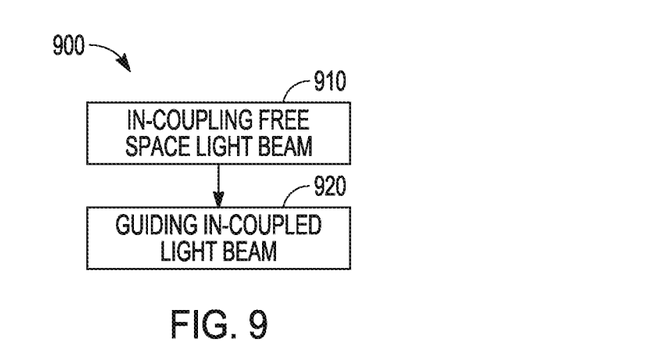
FIG. 9 illustrates a method of using a planar optical waveguide.

FIG. 9 illustrates a method of coupling a free space light beam to a planar waveguide. Light can be coupled into a waveguide core in a first region of the planar waveguide via an optical coupler and a first cladding having a first thickness (step 910). The coupled light can then be guided through a second region of the planar waveguide in which the first cladding can have a second thickness greater than the first thickness, and at least one step between the first thickness and the second thickness can be located in the first cladding between the first and second regions of the waveguide (step 920). Light can then be outcoupled from the waveguide core in a third region of the waveguide, which can be separated from the first region of the waveguide by the second region of the waveguide, via an optical coupler and the first cladding can have a third thickness that can be less than the second thickness, and a step between the second thickness and the third thickness can be located in the first cladding between the second and third regions of the waveguide. A spacer can be provided to mechanically define a distance between a core of the planar waveguide and an optical coupler in the first region of the waveguide, such as to provide for evanescent coupling in the first region of the waveguide. The first cladding can include a liquid crystal material. A solid fill material can be located between the liquid crystal material and the optical coupler. An optical coupler can be provided that includes a stepped structure including a series of stepwise decreases in thickness between the first region of the waveguide and the second region of the waveguide. A first optical cladding can be provided that includes a corresponding stepped structure including a series of stepwise increases in thickness between the first region of the waveguide and the second region of the waveguide. A distance between the core of planar waveguide and the length of the third region of the waveguide can determine a size and profile of the outcoupled portion of the guided light beam.

Figure 10:
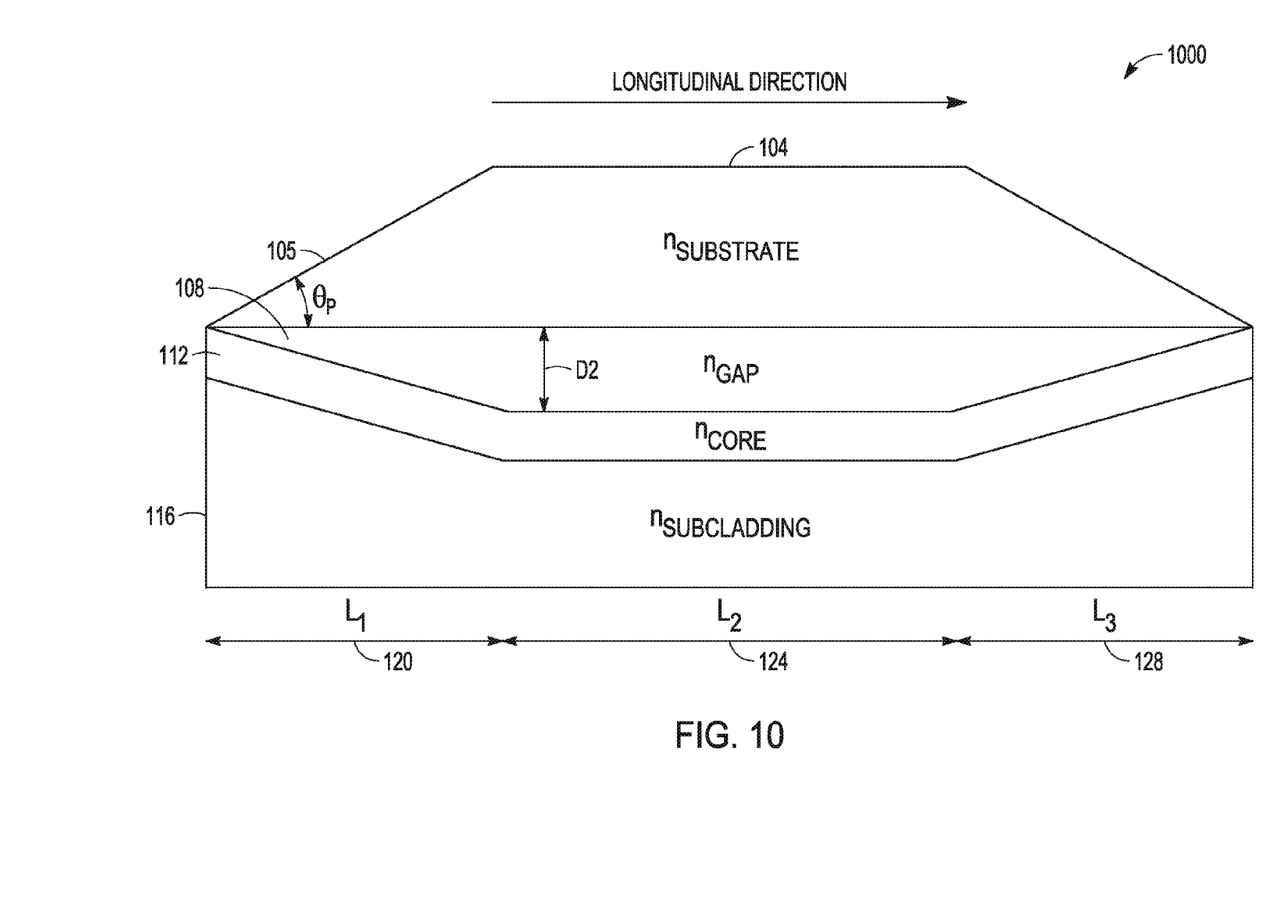
FIG. 10 illustrates an example of a planar optical waveguide.

FIG. 10 illustrates an example of a planar optical waveguide 1000 where a width of the first optical cladding 108 can be sloped in the first region 120 and the third region 128 of the waveguide 1000.

Each of the non-limiting aspects described herein can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37

C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A planar waveguide for receiving and guiding a light beam with reduced evanescent coupling of the light beam during the guiding, the planar waveguide comprising:
a waveguide core and a first and second optical cladding to guide the light beam along a length of the waveguide;
an optical coupler having a first coupling region separate from a guiding region, the optical coupler including a series of stepwise decreases in thickness between the first coupling region and the guiding region and the first optical cladding including corresponding stepwise increases in thickness between the first coupling region and the guiding region, and wherein the first coupling region of the optical coupler is capable of in-coupling light into the waveguide core.

2. The planar waveguide of claim 1 wherein the first coupling region of the optical coupler is capable of in-coupling a portion of the light beam having a near-field profile that overlaps with a near-field exponential profile.

3. The planar waveguide of claim 1 wherein the optical coupler includes a series of varying stepwise decreases in thickness between the first coupling region and the guiding region and the first optical cladding includes corresponding varying stepwise increases in thickness between the first coupling region and the guiding region.

4. The planar waveguide of claim 3 wherein the varying stepwise decreases in thickness include a varying height and width of an individual one of the stepwise decreases in thickness, and wherein the optical coupler is configured to couple a portion of the light beam having a near-field profile where a majority of the near-field profile overlaps with a near-field exponential profile.

5. The planar waveguide of claim 1 further comprising at least one spacer to define a distance between the waveguide core and the optical coupler that provides for in-coupling a portion of a light beam having a near-field profile that overlaps with a near-field exponential profile into the waveguide core and wherein the first optical cladding includes a liquid crystal material.

6. The planar waveguide of claim 5 comprising a solid fill material located between the liquid crystal material and the optical coupler.

7. The planar waveguide of claim 1 wherein the optical coupler is configured to couple a free space light beam having a Gaussian profile with an efficiency of at least 90%.

8. The planar waveguide of claim 1 wherein the optical coupler includes a second coupling region separate from the guiding region and a stepwise increase in thickness between the second coupling region and the guiding region and the first optical cladding includes a stepwise decrease in thickness between the second coupling region and the guiding region to increase coupling in the second coupling region, and wherein the second coupling region of the optical coupler is capable of transversely out-coupling a portion of the light beam guided by the waveguide core.

9. The planar waveguide of claim 8 wherein the optical coupler includes a series of varying stepwise increases in thickness between the second coupling region and the guiding region and the first optical cladding includes corresponding varying stepwise decreases in thickness between the second coupling region and the guiding region.

10. The planar waveguide of claim 9 wherein the varying stepwise increases in thickness include a varying height and width of individual ones of the stepwise increases in thickness, and wherein the varying stepwise increases in thickness can be adjusted to modify a profile of an out-coupled portion of the light beam guided by the waveguide core.

11. The planar waveguide of claim 1 wherein each individual stepwise decrease has a height less than a wavelength of the light beam.

12. The planar waveguide of claim 11 wherein the wavelength of the light beam can be approximately 1.5 µm and each individual stepwise decrease can be in a range from about 10 nm to 400 nm.

13. The planar waveguide of claim 1 wherein the optical coupler includes a second coupling region separate from the guiding region and the optical coupler includes a series of stepwise increases in thickness between the second coupling region and the guiding region and the first optical cladding includes corresponding stepwise decreases in thickness between the second coupling region and the guiding region and wherein the second coupling region of the optical coupler is capable of transversely out-coupling a portion of the light beam guided by the waveguide core.

14. A method of coupling a free space light beam to a planar waveguide, the method comprising:
in-coupling light into a core in a first region of the planar waveguide via an optical coupler and a first cladding having a first thickness, wherein the optical coupler includes a series of stepwise decreases in thickness between the first region of the planar waveguide and a second region of the planar waveguide and the first cladding a corresponding series of stepwise increases in thickness between the first region of the waveguide and the second region of the waveguide; and
guiding the in-coupled light through a second region of the planar waveguide in which the first cladding has a second-thickness greater than the first thickness.

15. The method of claim 14, comprising out-coupling light from the core in a third region of the waveguide, which is separated from the first region of the waveguide by the second region of the waveguide, via an optical coupler and the first cladding having a third thickness that is less than the second thickness, wherein a step between the second thickness and the third thickness is located in the first cladding between the second and third regions of the waveguide.

16. The method of claim 14 comprising providing a spacer to mechanically define a distance between a core of the planar waveguide and an optical coupler in the first region of the waveguide to provide for evanescent coupling in the first region of the waveguide, and wherein the first cladding includes a liquid crystal material.

17. The method of claim 16 comprising providing a solid fill material located between the liquid crystal material and the optical coupler.

18. The method of claim 16 wherein a distance between the core of planar waveguide and the length of the third region of the waveguide can determine a size and profile of the outcoupled portion of the guided light beam.

19. The method of claim 18, comprising providing at least one spacer to determine a distance between a core of the planar waveguide and the optical coupler in the first coupling region, and providing a liquid crystal material adjacent to the at least one spacer.

20. A method of manufacturing a planar waveguide, the method comprising:
   providing an optically transparent substrate;
   etching a portion of the optically transparent substrate to form a series of varying stepwise decreases in thickness between a first coupling region and the guiding region;
   depositing a first optical cladding having a series of stepwise increases in thickness between the first coupling region and the guiding region;
   depositing a core material stacked on the surface of the first optical cladding;
   depositing a second optical cladding stacked on the surface of the core material.

* * * * *